United States Patent [19]
Godwin et al.

[11] 3,959,702
[45] May 25, 1976

[54] STARTING CONTROL SYSTEM FOR SYNCHRONOUS MOTORS

[75] Inventors: Gurney L. Godwin, Pittsburgh; Donald R. Rippin, Monroeville, both of Pa.

[73] Assignee: Westinghouse Electric Corporation, Pittsburgh, Pa.

[22] Filed: Aug. 17, 1973

[21] Appl. No.: 389,420

[52] U.S. Cl. ............................. 318/181; 318/192; 318/193; 310/184
[51] Int. Cl.² .......................................... H02P 1/46
[58] Field of Search ........... 318/193, 181, 183, 192; 310/184, 254

[56] References Cited
UNITED STATES PATENTS

| | | |
|---|---|---|
| 3,405,338 | 10/1968 | Frola .............................. 318/193 X |
| 3,488,569 | 1/1970 | Allendorph, et al. ............ 310/184 X |
| 3,633,057 | 1/1972 | Smith et al. ..................... 310/184 |
| 3,654,503 | 4/1972 | Whitney .......................... 310/184 X |
| 3,774,062 | 11/1973 | Johnson .......................... 310/254 X |

*Primary Examiner*—Gene Z. Rubinson
*Attorney, Agent, or Firm*—G. H. Telfer

[57] ABSTRACT

A starting control system for synchronous motors is provided in which the usual separately mounted discharge resistor is eliminated. A relatively high resistance coil of small size is wound on each field pole, in addition to the normal field winding, and these coils are connected together and utilized as a discharge resistor during starting of the motor.

11 Claims, 4 Drawing Figures

STARTING CONTROL SYSTEM FOR SYNCHRONOUS MOTORS

BACKGROUND OF THE INVENTION

The present invention relates to synchronous motors, and more particularly to the discharge resistor and excitation control used during starting of such motors.

Synchronous motors are normally started by the induction motor action of the damper winding, the field winding being unexcited during starting. The damper winding acts as a squirrel-cage rotor winding, and the motor is accelerated by the induction motor torque thus produced until it reaches a speed close enough to synchronism for the field winding to be excited with direct current at the proper instant, and the motor then pulls into step. During the starting period when the motor is running at subsynchronous speed, a relatively high voltage is induced in the field winding since it is rotating at a lower speed than the rotating field of the stator winding. In order to limit this voltage and carry the induced field current, a discharge resistor is connected across the field winding, and since this closes the circuit of the field winding, the starting torque is somewhat increased and the starting performance is improved.

In the conventional practice, this starting resistor has been separately mounted either on the rotor of the machine itself or, in some cases, externally of the motor. In either case, the starting resistors used heretofore have been relatively large and expensive and the necessary mounting provisions and space requirements have complicated the mechanical design, especially where the resistor was mounted on the rotor. This has been a particular disadvantage in the case of brushless synchronous motors, where the excitation system and starting control are carried entirely on the rotor, and the necessity for also mounting the starting resistor on the rotor has involved considerable difficulty and has resulted in rotors of large size and high cost.

SUMMARY OF THE INVENTION

In accordance with the present invention, a physical arrangement and starting control system are provided in which the separately mounted discharge resistor is eliminated. This is accomplished by means of a small coil wound on each of the field poles of the machine in addition to the normal field winding. This additional coil is preferably wound of relatively high resistance wire, and is multi-turn coil of small dimensions as compared to the coils of the field winding. These small coils are connected together to constitute a resistance winding, and the winding thus formed is used as a starting and discharge resistor during starting of the motor. In this way, no separately mounted resistor is required and a simle and low-cost arrangement is provided. In brushless synchronous motors, the starting resistor has heretofore been mounted on the control wheel which carries the excitation and control circuits. By removing the resistor, the size and cost of the wheel are reduced and other components, such as rectifier diodes, can be carried on the wheel.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
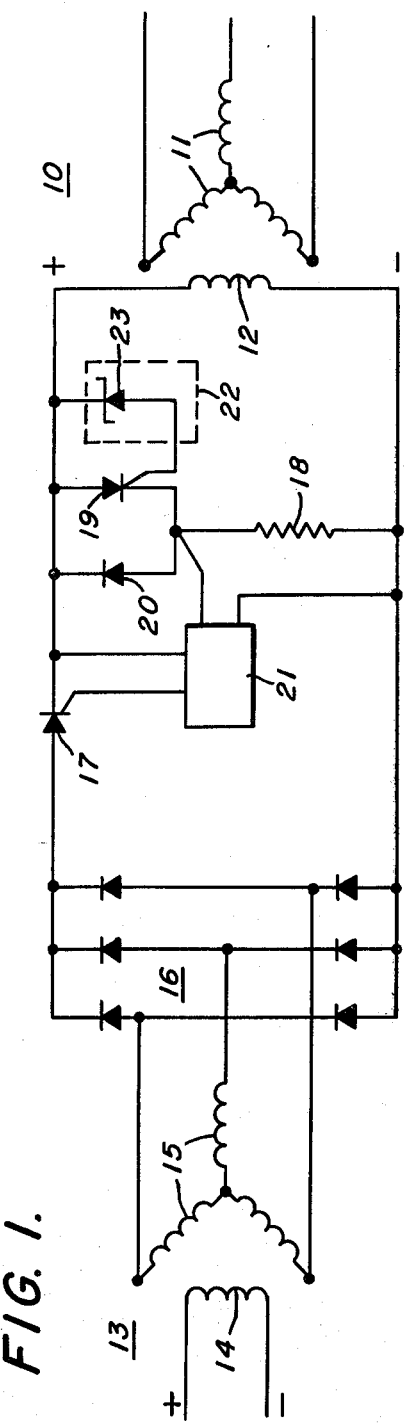
FIG. 1 is a schematic diagram showing a typical circuit for a brushless synchronous motor.

The invention is generally applicable to any synchronous motor, but it has particular advantages in brushless synchronous motors, and is shown in the drawings for the purpose of illustration embodied in a motor of this type. A typical circuit for a brushless synchronous motor is shown in the schematic diagram of FIG. 1. As there shown, the motor 10 has a three-phase stator winding 11, and has a field winding 12 on the rotor. Field excitation is provided by an alternating current exciter 13 which has a field winding 14 on its stator excited with direct current from any suitable source. The exciter 13 has an armature winding 15, shown as a three-phase winding, carried on the rotor so as to be rotatable with the field winding of the motor. The armature winding 15 is connected to a rectifier bridge 16 to provide a direct current output for excitation of the field winding 12. The exciter armature winding 15, the rectifier 16 and the field winding 12 are all carried on the same shaft, or are otherwise rotatable together on a common rotating member.

The field winding excitation provided by the output of the rectifier 16 is controlled by a solid-state switch or thyristor 17 connected in series between the rectifier output and the field winding 12. During the starting period when the motor is operating at subsynchronous speed, a discharge resistor 18 must be connected across the field winding 12 in order to limit the high induced voltage in the field winding and to increase the starting torque by short-circuiting the field winding to provide additional motor torque. Connection of the discharge resistor 18 across the field winding 12 is controlled by a second thyristor 19 and a diode 20 connected with opposite polarity. Solid-state control circuits are provided for firing the thyristors 17 and 19. The thyristor 17 is fired to excite the field winding 12 with direct current at the proper time and phase angle and a control module 21 is provided for this purpose. Any suitable control circuit may be utilized in the control module 21 such as either of the excitation controls shown in Frola U.S. Pat. No. 3,405,338 or Hoffmann et al. U.S. Pat. No. 3,414,788. The control circuits shown in both of these patents respond to the frequency of the induced voltage in the field winding 12 and may be connected across the field winding or, as shown, across the discharge resistor 18. The thyristor 19 is fired by means of a control module 22 which, in the simplest form, may comprise a Zener diode 23 connected as shown to respond to the voltage of the field winding 12.

The operation of the motor circuit is as follows. When it is desired to start the motor, the stator winding 11 is energized and the motor will start by induction motor action resulting from the conventional damper bars on the field member, the thyristor 17 being in its non-conductive or blocking state at this time. A relatively high voltage of high slip frequency is induced in the field winding 12 during the starting period when the motor is running at subsynchronous speed, and this voltage is sufficient to break down the Zener diode 23 and fire the thyristor 19 to connect the discharge resistor 18 across the field winding 12, the diode 20 providing conduction on alternate half-cycles. The motor 10 accelerates until it approaches synchronous speed, the slip frequency correspondingly decreasing, and when the control circuit 21 senses the proper point as indicated by the slip frequency and phase angle of the induced voltage, the thyristor 17 is fired to apply direct current excitation from the rectifier 16 to the field winding 12. Since the induced voltage across the field winding drops to essentially zero as the motor reaches synchronism, the Zener diode 23 will become non-conductive and prevent firing of the thyristor 19 so that the discharge resistor 18 is disconnected from the field winding. The motor is then in its normal operating condition and will pull into step and run as a synchronous motor.

In the conventional design of synchronous motors, the discharge resistor 18 has been separately mounted, and in the case of a brushless motor as shown in FIG. 1, the discharge resistor was mounted on a control wheel which also carried the switching and control components. Mounting the resistor on the control wheel results in mechanical problems and usually leads to a relatively large and heavy wheel to provide adequate mechanical support and ventilation for resistors of the necessary size and number to obtain the required resistance. In the construction shown in FIGS. 2, 3 and 4, no separate resistor is required and the problems involved in separately mounting the resistor are eliminated.

Figure 2:
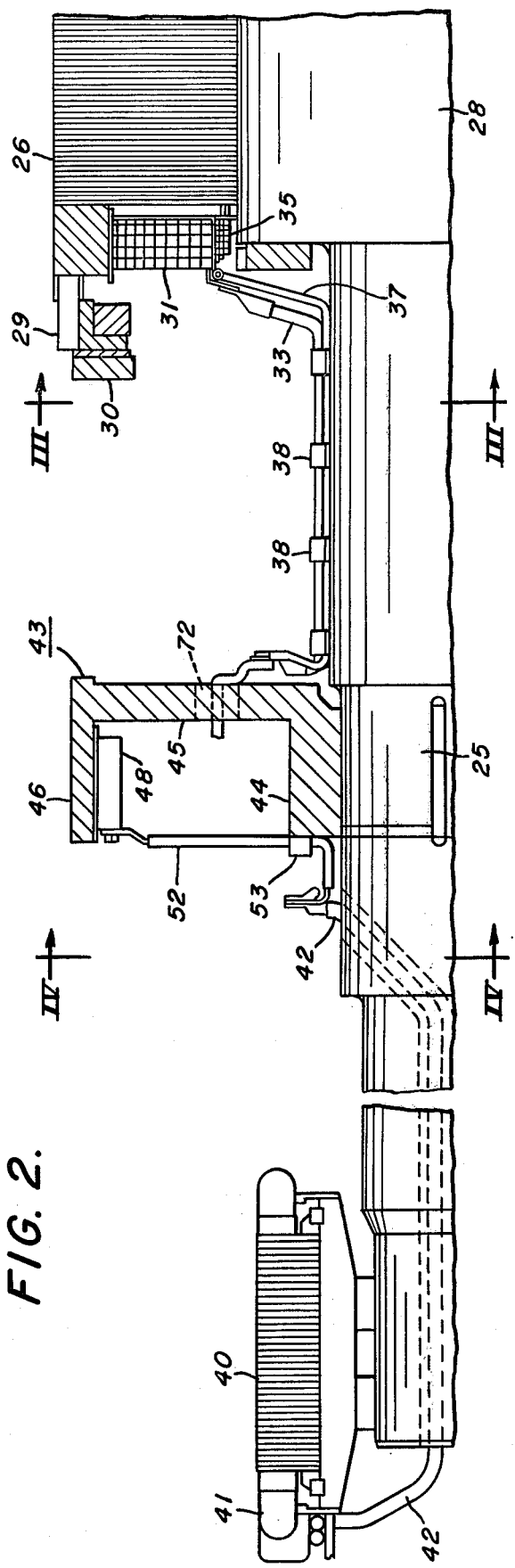
FIG. 2 is a partial longitudinal sectional view of the rotor of a brushless synchronous motor embodying the invention.
Figure 3:
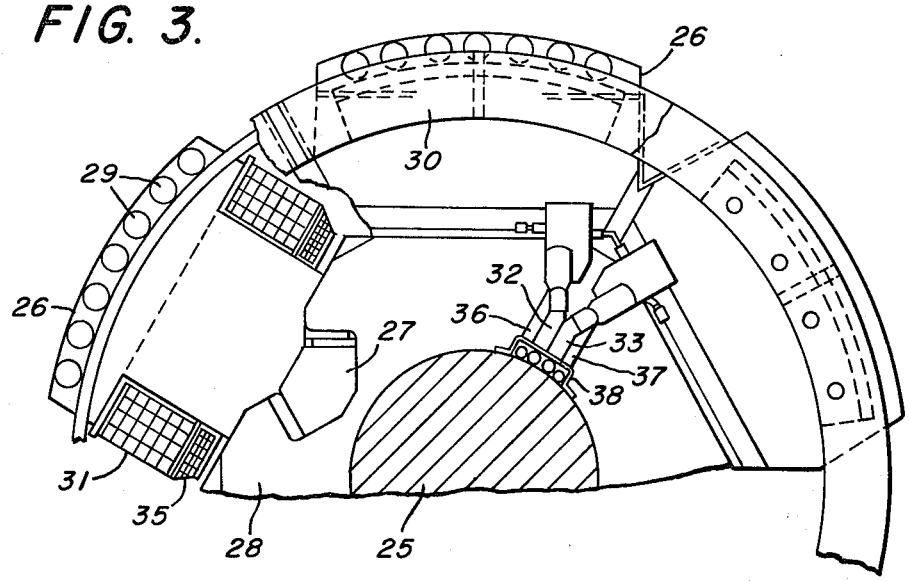
FIG. 3 is a view in elevation of the field member of the motor, taken substantially along the line III—III of FIG. 2.

FIG. 2 shows the rotor member of a brushless synchronous motor embodying the invention, a stator (not shown) of any suitable or usual construction being also provided. The rotor includes a shaft 25 carrying a plurality of field poles 26 of any suitable construction. The poles 26 are of the usual laminated construction and, as shown in FIG. 3, are mounted by means of dovetails 27 on a spider portion 28 of the shaft. Any suitable or usual type of pole and spider construction may be provided. Each pole 26 has a plurality of damper bars 29 in the pole face, and the bars 29 are connected at the ends by resistance rings 30 to form a damper winding of conventional arrangement. Any suitable or usual type of damper winding may, of course, be provided. A field coil 31 of usual type is mounted on each of the field poles 26, and the coils 31 are connected together in the usual manner to form a field winding provided with leads 32 and 33 for connection to the excitation system.

In accordance with the invention, an additional resistance winding is provided on each of the poles 26. As shown in the drawing, this is a relatively small multiturn coil 35 which is wound with a suitable number of turns of relatively high resistance wire. The coils 35 are separately insulated and are disposed on the poles 26, preferably below the field coils 31 as shown. The coils 35 are of high resistance and relatively small size, as compared to the field winding, and the coils 35 on all of the poles 26 are connected together in series and provided with leads 36 and 37 for connection to the control circuit. The field leads 32 and 33 and the resistance winding leads 36 and 37 may be brought together as shown in FIG. 3 and disposed side-by-side. The leads extend axially along the shaft 25 and are held in position by cleats 38 or other suitable means.

Excitation for the field winding 31 is provided by an alternating current exciter such as the exciter 13 of FIG. 1. The exciter may be disposed at the opposite end of the shaft 25 and includes a rotor member 40 cooperating with a stator (not shown) of any suitable type carrying a field winding. The rotor 40 may be of any suitable construction carrying a polyphase armature winding 41 and provided with output leads 42 which extend axially through a bore in the shaft 25. A control wheel 43 is mounted on the shaft 25 between the main field member and the exciter. The wheel 43 has a hub portion 44 pressed or otherwise secured on the shaft 25, and has a radial flange portion 45 and an axially-extending rim portion 46. The control wheel 43 carries the starting control and switching circuitry for the motor, and the exciter leads 42 are brought out of the shaft adjacent the wheel on one side thereof, as shown, while the field and resistance leads 32, 33, 36 and 37 extend from the field member to the opposite side of the wheel 43.

Figure 4:
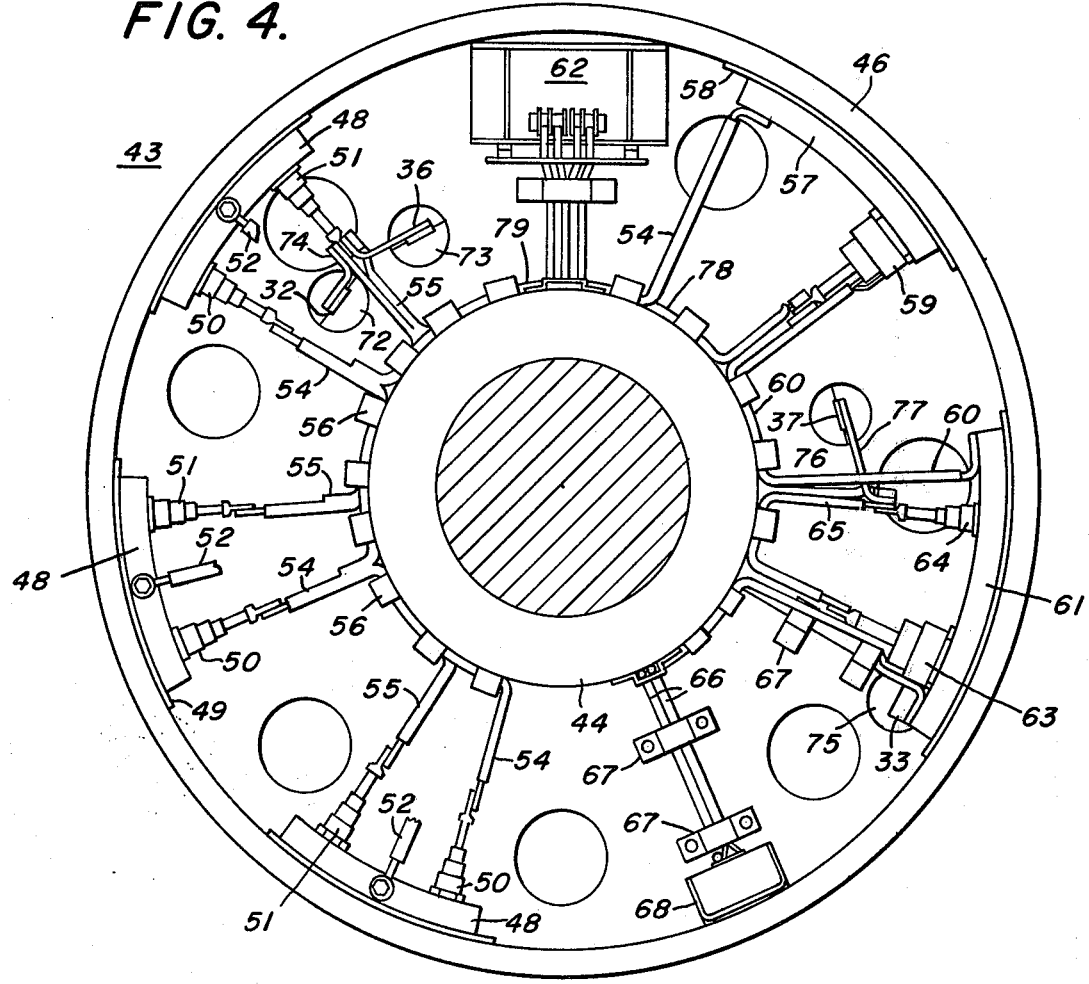
FIG. 4 is a view in elevation of a control wheel, taken substantially on the line IV—IV of FIG. 2.

The control wheel 43 carries the control and switching devices for the excitation system. As shown in FIG. 4, three heat sinks 48, which may be aluminum blocks, for example, are mounted on the interior surface of the rim 46 and insulated therefrom as indicated at 49. Each of the heat sinks 48 has mounted on it in thermal and electrical contact a positive diode 50 and a negative diode 51; that is, the two diodes are of opposite polarity with respect to the heat sink. Each of the three leads 42 from the exciter 40 is connected to one of the three heat sinks 48. Thus, as seen in FIG. 2, each lead 42 is attached to a generally radial lead 52 secured to the wheel 43, as by a cleat 53, and connected to the corresponding heat sink. The positive diodes 50 are connected to leads 54 and the negative diodes 51 to leads 55 which extend circumferentially around the hub 44 and are held in place thereof in any suitable manner, as by cleats 56. The leads 54 and 55 thus constitute the direct current output leads of a three-phase rectifier bridge assembly.

The positive lead 54 extends around the hub 44 and is connected to another heat sink 57 mounted on the rim 46 and insulated therefrom as shown at 58. As solid-state switching device or thyristor 59 is mounted on the heat sink 57 in thermal and electrical contact therewith, and the cathode terminal of the thyristor 59 is connected by a conductor 60 to another heat sink 61 similarly mounted on the rim 46 and insulated therefrom. The gate of the thyristor 59 is connected by a circumferential conductor to a control module 62 mounted on the flange portion 45 of the control wheel. A second thyristor 63 and a diode 64 are mounted on the heat sink 61 in thermal and electrical contact herewith. The diode 64 and the cathode terminal of the thyristor 63 are connected together by a conductor 65. The gating circuit of the thyristor 63 is completed through conductors 66 secured to the wheel by cleats 67 and connecting the gate electrode of thyristor 63 and the heat sink 61 to a control module 68 mounted on the rim of the control wheel and corresponding in function to the module 22 of FIG. 1.

As previously indicated, the field winding leads 32 and 33 and the resistance winding leads 36 and 37 are carried along the shaft 25 to the wheel 43 and there connected to the excitation and control circuit. As shown in FIG. 2, each of these leads terminates in a radial portion which is extended through the wheel. The negative field lead 32 is carried in this manner through an insulating bushing 72 in the wheel flange 45, and the resistance winding lead 36 is similarly carried through another insulating bushing 73. These two leads are connected together and to the negative rectifier output lead 55 at 74. The positive field lead 33 is brought through the flange through an insulating bushing 75 and connected to the heat sink 61 as shown. The other resistance winding lead 37 is brought through an insulating bushing 76 and connected by a lead 77 to the conductor 65 and to a lead 78 which connects to the control module 62. Another lead 79 from the module 62 extends to the negative rectifier output lead 55, so that the module 62 is connected across the resistance winding to respond to the induced field voltage, as previously described. It will be seen by an examination of FIG. 4, that the circuit is the same as shown in FIG. 1, and that all the excitation and control elements, including the rectifier bridge, are carried on the control wheel in a very compact assembly.

The discharge resistor constituted by the resistance coils 35 is connected across the field winding during starting in the manner previously described and performs the functions of a discharge and starting resistor. No separate resistor is required, however, and the problems involved in separately mounting such a resistor are thus eliminated. The new winding is a multi-turn coil of small cross-section which takes up little space on the field poles. During starting, this winding increases the total turns surrounding each pole, thereby reducing the induced field current. This high resistance winding also provides additional torque during the accelerating period and tends to lower the voltage across the field winding, as compared to previously used types of resistors, for the same exciter voltage. The elimination of a separate starting resistor provides additional space on the control wheel for other purposes. Thus, in the illustrated embodiment, the rectifier diodes which supply the field excitation are mounted on the control wheel, reducing the size and cost of the exciter assembly by eliminating the rectifier assembly from the exciter.

The invention has been described with particular reference to brushless synchronous motors but it will be apparent that it is equally applicable to conventionally excited machines in which the field excitation is supplied through slip rings by an external exciter. The new resistance winding is placed on the field poles in the same manner as described above and eliminates the separately mounted resistors previously required. The same advantages are thus obtained for conventional machines.

Although a particular embodiment of the invention has been shown and described for the purpose of illustration, it will be apparent that other embodiments and modifications are possible within the scope of the invention.

What is claimed is:

1. In a synchronous motor having a rotor member with a plurality of salient poles thereon, a field coil disposed on each pole, said field coils being connected together to constitute a field winding, a second coil on each pole, said second coils being connected together to constitute a resistance winding, means for providing direct current excitation for said field winding, and control means for connecting said resistance winding across the field winding during starting of the motor and for disconnecting the resistance winding and applying direct current excitation to the field winding for synchronous operation of the motor.

2. The combination defined in claim 1 in which each of said second coils is a multi-turn coil of relatively high resistance wire as compared to said field coils.

3. The combination defined in claim 2 in which each of said second coils is of small dimensions and high resistance as compared to said field coils.

4. The combination defined in claim 1 in which said excitation means and control means include an alternating current exciter and a rotatable control member carrying rectifier diodes and solid-state control devices thereon.

5. In a synchronous motor, a rotor member having a plurality of salient poles thereon, field coils disposed on said poles and connected together to form a field winding, a resistance winding comprising a plurality of coils disposed on said poles and connected together, an alternating current exciter having an armature member rotatable with the rotor member and having an armature winding thereon, a control wheel rotatable with the rotor member, rectifier means on said control wheel connected to said armature winding to provide a direct current output, and solid-state control means on said control wheel adapted to connect said resistance winding across the field winding during starting of the motor and to disconnect the resistance winding and connect the direct current output of said rectifier means to the field winding for synchronous operation of the motor.

6. The combination defined in claim 5 in which said resistance winding comprises on each pole a multi-turn coil of relatively high resistance wire as compared to the field coils.

7. The combination defined in claim 6 in which said coils of said resistance winding are of small dimensions as compared to the field coils.

8. The combination defined in claim 5 in which said rectifier means comprises a plurality of semiconductor diodes mounted on said control wheel and insulated therefrom, and means for connecting said diodes together in a rectifier circuit.

9. The combination defined in claim 8 and including a plurality of heat sinks mounted on said control wheel and insulated therefrom, said diodes being mounted on said heat sinks in electrical contact therewith, leads connecting said exciter armature winding to the heat sinks, means on the control wheel interconnecting the diodes and the control means in an excitation supply and control circuit, and means for separately connecting said field winding and said resistance winding to the excitation supply and control circuit.

10. A synchronous motor rotor comprising: a shaft; a plurality of salient poles secured to and extending radially outward from said shaft; a plurality of field coils each encircling one of said poles in a first plane parallel to the shaft axis; a plurality of additional coils each encircling one of said poles in a second plane parallel to said first plane; said field coils being connected together to form a field winding having a pair of leads; said additional coils being connected together to form a starting resistance winding having a pair of leads electrically independent of said leads of said field winding, said coils of said starting resistance winding being of higher resistance than said coils of said field winding.

11. The subject matter of claim 10 wherein: said coils of said starting resistance winding are closer to said shaft and are of smaller dimensions than said coils of said field winding.

* * * * *